(12) United States Patent
Heguri et al.

(10) Patent No.: US 9,567,239 B2
(45) Date of Patent: Feb. 14, 2017

(54) METHOD FOR PRODUCING HIGH-PURITY NICKEL SULFATE AND METHOD FOR REMOVING IMPURITY ELEMENT FROM SOLUTION CONTAINING NICKEL

(71) Applicant: Sumitomo Metal Mining Co., Ltd., Tokyo (JP)

(72) Inventors: Shin-ichi Heguri, Niihama (JP); Yoshitomo Ozaki, Niihama (JP); Keiji Kudo, Niihama (JP)

(73) Assignee: Sumitomo Metal Mining Co., Ltd. (JP)

( * ) Notice: Subject to any disclaimer, the term of this patent is extended or adjusted under 35 U.S.C. 154(b) by 0 days.

(21) Appl. No.: 14/653,077

(22) PCT Filed: Jan. 20, 2014

(86) PCT No.: PCT/JP2014/051000
§ 371 (c)(1),
(2) Date: Jun. 17, 2015

(87) PCT Pub. No.: WO2014/115686
PCT Pub. Date: Jul. 31, 2014

(65) Prior Publication Data
US 2015/0329375 A1    Nov. 19, 2015

(30) Foreign Application Priority Data
Jan. 25, 2013   (JP) .................. 2013-012563

(51) Int. Cl.
*C01G 51/00*   (2006.01)
*C01G 53/10*   (2006.01)
(52) U.S. Cl.
CPC ........... *C01G 53/10* (2013.01); *C01P 2006/80* (2013.01)

(58) Field of Classification Search
None
See application file for complete search history.

(56) References Cited

U.S. PATENT DOCUMENTS 3,469,967 A * 9/1969 Evans ................. B22F 9/18
75/232
5,584,908 A * 12/1996 Scheie ................. B22F 1/0011
75/348

(Continued)

FOREIGN PATENT DOCUMENTS

| CN | 102690956 | * 9/2012 |
| GB | 1 437 191 | 5/1976 |

(Continued)

OTHER PUBLICATIONS

Ebjiaiii, et al. Zh. Prikl. Khim., Nov. 1985, vol. 58, No. 11, pp. 2417-2421.

(Continued)

*Primary Examiner* — Melvin C Mayes
*Assistant Examiner* — Sheng H Davis
(74) *Attorney, Agent, or Firm* — Gerald E. Hespos; Michael J. Porco; Matthew T. Hespos

(57) ABSTRACT

Provided are an impurity-element removing method for selectively removing magnesium from a nickel-containing solution, and a method for producing high-purity nickel sulfate using the impurity-element removing method. The production method includes a production process in the production method of producing high-purity nickel sulfate from a nickel-containing solution, and the nickel-containing solution in the production process is subjected to an impurity-element removal treatment that includes: a hydroxylation step of adding an alkali hydroxide to the nickel-containing solution in the production process to form a hydroxylated slurry; a carbonation step of adding an alkali carbonate to the hydroxylated slurry to form a carbonated (Continued)

slurry, and recovering nickel component from the solution; a solid-liquid separation step for the slurry thus obtained; and a neutralization step of subjecting a solution after reaction obtained by solid-liquid separation to a neutralization, and recovering an impurity element included in the nickel-containing solution in the production process.

6 Claims, 2 Drawing Sheets

(56) References Cited

U.S. PATENT DOCUMENTS

| | | | | |
|---|---|---|---|---|
| 2007/0295613 | A1* | 12/2007 | Moyes | C22B 3/08 205/771 |
| 2008/0075645 | A1* | 3/2008 | Wallevik | C01F 5/30 423/140 |
| 2009/0087361 | A1* | 4/2009 | Rishea | C01G 53/003 423/139 |
| 2012/0269713 | A1 | 10/2012 | Berni et al. | |
| 2015/0078972 | A1 | 3/2015 | Idegami et al. | |

FOREIGN PATENT DOCUMENTS

| | | |
|---|---|---|
| GB | 1 437 192 | 5/1976 |
| JP | 49-91996 | 9/1974 |
| JP | 53-106623 | 9/1978 |
| JP | 61-106422 | 5/1986 |
| JP | 10-30135 | 2/1998 |
| JP | 10-310437 | 11/1998 |
| JP | 2004-307270 | 11/2004 |
| JP | 2006-225217 | 8/2006 |
| JP | 2013-151717 | 8/2013 |
| WO | 2013/145909 | 10/2013 |

OTHER PUBLICATIONS

Satoshi Matsumoto et al., "Yobai Chushutsuho ni yoru Nickel/Cobalt no Bunri Seisei", Shigen Sozai, Sep. 13, 2010, vol. 2010, No. 2, pp. 113-116.
International Search Report of Apr. 22, 2014.
Ullman's Encyclopedia of Industrial Chemistry "Nickel Compounds".

* cited by examiner

METHOD FOR PRODUCING HIGH-PURITY NICKEL SULFATE AND METHOD FOR REMOVING IMPURITY ELEMENT FROM SOLUTION CONTAINING NICKEL

BACKGROUND

1. Field of the Invention

The present invention relates to a production process for efficiently removing magnesium from a solution containing nickel and producing high-purity nickel sulfate, in particular, the invention can be applied to a treatment for an in-process intermediate product solution that is generated during a nickel hydrometallurgical process.

2. Description of the Related Art

A method for industrially producing nickel sulfate typically obtains a nickel sulfate solution, or nickel sulfate crystals by evaporation and crystallization or the like, through processes of dissolving a raw material in an acid solution and then removing impurities.

In the production method, the process of removing impurities may be carried out by various methods depending on the impurities included in the raw material. The removal process first carries out a solution purification process of forming a neutralized precipitate containing a portion of impurities and a residual liquid after separation using a neutralizing agent, and then carries out a solvent extraction process of extracting the residual liquid after separation using a conventional organic solvent to further perform a removal treatment of impurity elements.

Particularly, as a method for efficiently separating nickel and cobalt when cobalt is included in the raw material, a solvent extraction method using phosphonic acid or phosphinic acid has been widely known.

Regarding the phosphonic acid or phosphinic acid used in such a solvent extraction method, 2-ethylhexylphosphonic acid mono-2-ethylhexyl ester and di(2,4,4-trimethylpentyl) phosphinic acid are capable of satisfactory extraction and separation of nickel and cobalt and are thus suitable.

Furthermore, the solvent extraction using phosphonic acid and phosphinic acid is dependent on a pH of the solution, and the extraction efficiency is increased when the pH is increased. Also, since the extraction-related pH-dependency varies with elements, cobalt and other impurity elements are extracted into an organic solvent by utilizing this characteristic.

That is, impurity elements are divided into an organic phase by setting the pH to a value lower than pH at which nickel is extracted, and thus nickel remains in the aqueous phase, and as a result, a nickel solution after impurities have been removed can be obtained.

Furthermore, Japanese Patent Application Laid-Open No. 10-310437, Japanese Patent Application Laid-Open No. 10-30135 and Japanese Patent Application Laid-Open No. 2004-307270 disclose methods in which nickel is extracted in advance into an organic solvent under high pH conditions, this organic solvent containing extracted nickel is brought into contact with a nickel solution containing impurities, thereby an exchange reaction occurs by which elements that are more easily extracted than nickel are transferred to the organic phase, while nickel in the organic solvent is transferred to the aqueous phase side, and thus impurities in the nickel solution are removed.

These methods are effective as methods for preventing impurity elements such as Na included in a pH adjusting agent, from being incorporated into a nickel solution and contaminating a manufactured product.

However, among impurity elements, magnesium in the solution exhibits a reaction behavior similar to that of nickel, and therefore, it has been difficult to selectively remove magnesium from a nickel solution even if a solution purification process or a solvent extraction process was used in a process for producing nickel sulfate as described above.

For that reason, when a solution containing a small amount of nickel that is discharged from a solvent extraction process or a solution purification process (magnesium is also included in this solution) is recycled within the system, magnesium that remains unremoved also recurs, as is the case of nickel. Therefore, magnesium is accumulated in the system, and this has been a cause for an increase in the magnesium level in manufactured products.

Under such circumstances, an object of the present invention is to provide a removal method of an impurity element for selectively removing magnesium from a solution containing nickel, and a method for producing high-purity nickel sulfate by incorporating the removal method of an impurity element into a process of the production method.

SUMMARY OF THE INVENTION

To solve the above-mentioned problems, a first aspect of the present invention relates to a method for producing high-purity nickel sulfate, characterized in that the method includes a production process for producing high-purity nickel sulfate from a solution containing nickel, and the solution containing nickel used in the production process is subjected to a removal treatment of an impurity element through the following steps (1) to (4) in order:

(1) a hydroxylation step of adding an alkali hydroxide to a portion of the solution containing nickel in the production process, and thereby forming a hydroxylated slurry including a precipitate of nickel hydroxide and a solution after hydroxylation other than the precipitate, the precipitate of nickel hydroxide being caused by precipitation of the nickel contained in the solution;

(2) a carbonation step of adding an alkali carbonate to the hydroxylated slurry, and subjecting the nickel contained in the solution after hydroxylation to a carbonation treatment to form a carbonated slurry including a precipitate of nickel carbonate and a solution after carbonation other than the precipitate of nickel carbonate, the precipitate of nickel carbonate being caused by precipitation of the nickel contained in the solution after hydroxylation, and then forming a mixed slurry including a mixed precipitate of the nickel hydroxide and the nickel carbonate, and a solution after reaction other than the mixed precipitate, the mixed precipitate being formed by converting the nickel included in the solution;

(3) a solid-liquid separation step of separating the mixed slurry into the mixed precipitate of nickel hydroxide and nickel carbonate, and the solution after reaction; and (4) a neutralization step of subjecting the solution after reaction to a neutralization treatment, thereby producing a neutralized precipitate containing an impurity element to recover the impurity element included in the solution in the production process.

A second aspect of the invention relates to a method for producing high-purity nickel sulfate, characterized in that the impurity element in the first aspect is magnesium.

A third aspect of the invention relates to a method for producing high-purity nickel sulfate, characterized in that the production process in the first and second aspects further includes a leaching step of dissolving a nickel-containing material; and a solvent extraction step of separating nickel and cobalt by a solvent extraction method.

A fourth aspect of the invention relates to a method for producing high-purity nickel sulfate, characterized in that the nickel-containing material in the third aspect corresponds to mixed sulfides of nickel and cobalt, crude nickel sulfate as an industrial intermediate, nickel oxide, nickel hydroxide, nickel carbonate, and nickel powder.

A fifth aspect of the invention relates to a method for producing high-purity nickel sulfate, characterized in that the pH used during the process in the hydroxylation step of (1) in the first to fourth aspects is in a range of 7.5 to 7.8.

A sixth aspect of the invention relates to a method for producing high-purity nickel sulfate, characterized in that the pH used during the process in the carbonation step of (2) in the first to fifth aspects is in a range of 7.7 to 8.0.

A seventh aspect of the invention relates to a method for removing an impurity element from a solution containing nickel, characterized in that the method includes the following steps (1) to (4) in order, to remove an impurity element from a solution containing nickel:

(1) a hydroxylation step of adding an alkali hydroxide to a portion of the solution containing nickel in the production process, and thereby forming a hydroxylated slurry including a precipitate of nickel hydroxide and a solution after hydroxylation other than the precipitate, the precipitate of nickel hydroxide being caused by precipitation of the nickel contained in the solution;

(2) a carbonation step of adding an alkali carbonate to the hydroxylated slurry, and subjecting the nickel contained in the solution after hydroxylation to a carbonation treatment to form a carbonated slurry including a precipitate of nickel carbonate and a solution after carbonation other than the precipitate of nickel carbonate, the precipitate of nickel carbonate being caused by precipitation of the nickel contained in the solution after hydroxylation, and then forming a mixed slurry including a mixed precipitate of the nickel hydroxide and the nickel carbonate, and a solution after reaction other than the mixed precipitate, the mixed precipitate being formed by converting the nickel included in the solution;

(3) a solid-liquid separation step of separating the mixed slurry into the mixed precipitate of nickel hydroxide and nickel carbonate and the solution after reaction; and (4) a neutralization step of subjecting the solution after reaction to a neutralization treatment, thereby producing a neutralized precipitate containing an impurity element to recover the impurity element included in the solution in the production process.

An eighth aspect of the invention relates to a method for removing an impurity element from a nickel-containing solution, characterized in that the impurity element in the seventh aspect is magnesium.

A ninth aspect of the invention relates to a method for removing an impurity element, characterized in that the pH used during the process in the hydroxylation step of (1) in the seventh and eighth aspects is in the range of 7.5 to 7.8.

A tenth aspect of the invention relates to a method for removing an impurity element, characterized in that the pH used during the process in the carbonation step of (2) in the seventh to ninth aspects is in the range of 7.7 to 8.0.

According to the invention, in the production method for obtaining high-purity nickel sulfate from a solution containing nickel, the amount of magnesium in a high-purity nickel sulfate product can be reduced to a large extent by applying a process of efficiently discharging magnesium in particular, which is not easily removed selectively, out of the production process system, and thus nickel sulfate of higher purity can be provided.

DETAILED DESCRIPTION OF THE PREFERRED EMBODIMENTS

According to the present invention, there is provided a production method for obtaining high-purity nickel sulfate from a solution containing nickel, characterized in that a production process thereof incorporates a series of steps that constitute a method for removing an impurity element from an in-process solution, as shown in order of items (1) to (4) described below, and thereby high-purity nickel sulfate having a reduced amount of an impurity element, particularly Mg, from the solution containing nickel is produced.

[Method for Removing Impurity Element from Solution Containing Nickel]

(1) A hydroxylation step of adding an alkali hydroxide to a portion of the solution containing nickel in the production process, and thereby forming a hydroxylated slurry including a precipitate formed by converting the nickel included in the solution to nickel hydroxide, and a solution after hydroxylation other than the precipitate;

(2) a carbonation step of adding an alkali carbonate to the hydroxylated slurry formed in the hydroxylation step of (1), and carrying out a carbonation process of forming a carbonated slurry including a precipitate formed by converting the nickel included in the solution after hydroxylation, which constitutes the hydroxylated slurry, to nickel carbonate and a solution after carbonation other than the precipitate, and then providing a mixed slurry including a mixed precipitate of nickel hydroxide and nickel carbonate based on the nickel in the solution containing nickel, and a solution after reaction;

(3) a solid-liquid separation step of separating the mixed slurry obtained in the carbonation step of (2) into the mixed precipitate of nickel hydroxide and nickel carbonate and the solution after reaction; and (4) a neutralization step of subjecting the separated solution after reaction in the solid-liquid separation step of (3), to a neutralization treatment, thereby producing a neutralized precipitate containing an impurity element, and recovering the impurity element included in the solution in the production process.

Hereinafter, the invention is described by making reference to FIG. 1 and FIG. 2.

Figure 1:
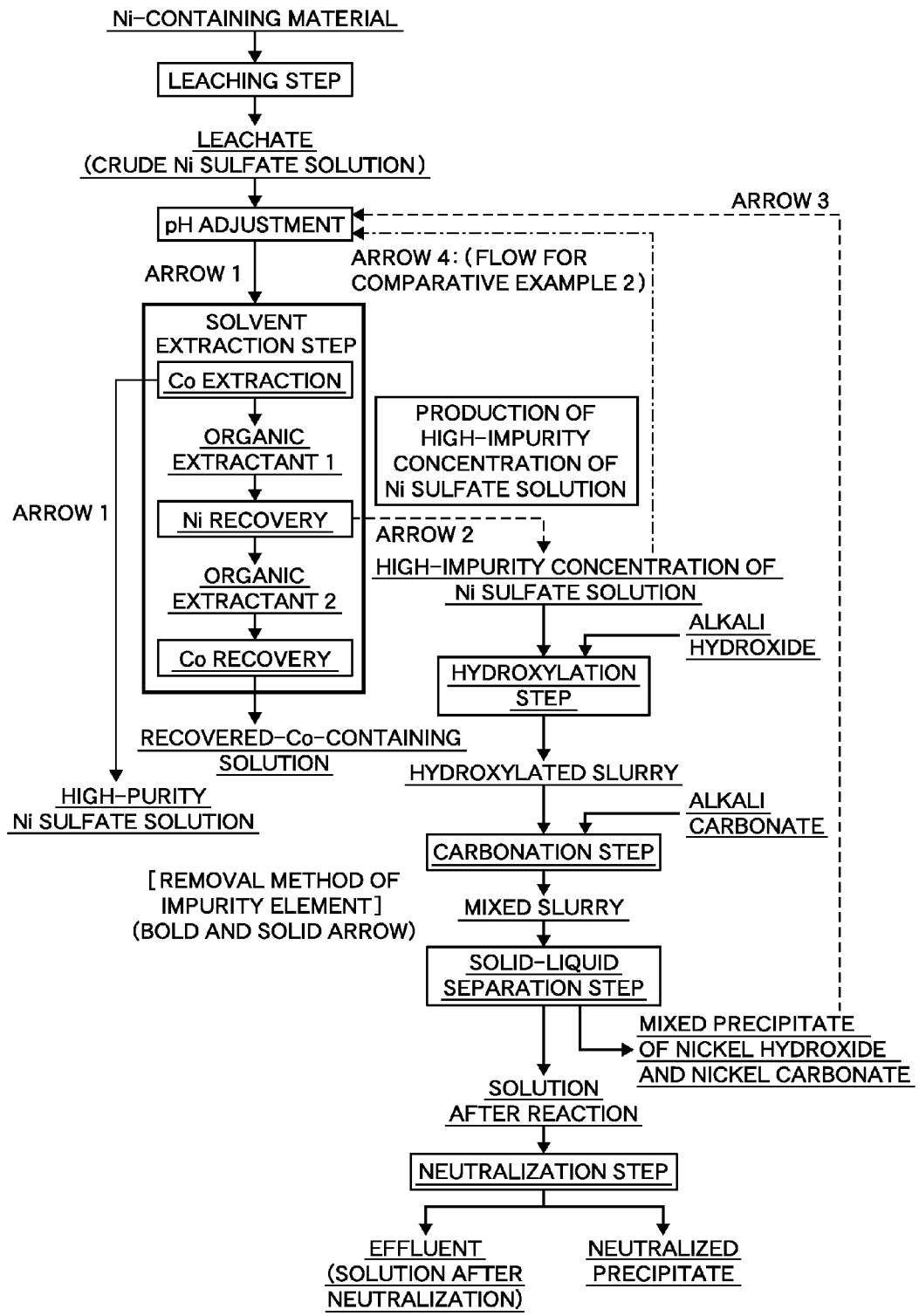
FIG. 1 is a flowchart for the production of high-purity nickel sulfate according to the invention.

FIG. 1 is a flowchart for the production of high-purity nickel sulfate of the invention. FIG. 2 is a flowchart for the method for removing an impurity element from a solution containing nickel of the invention.

[Method for Producing High-Purity Nickel Sulfate Solution]

FIG. 1 shows a flowchart for the production, and usually, a high-purity nickel sulfate solution is produced by a solvent extraction process as the process proceeds along the "(solid) arrow 1".

Figure 2:
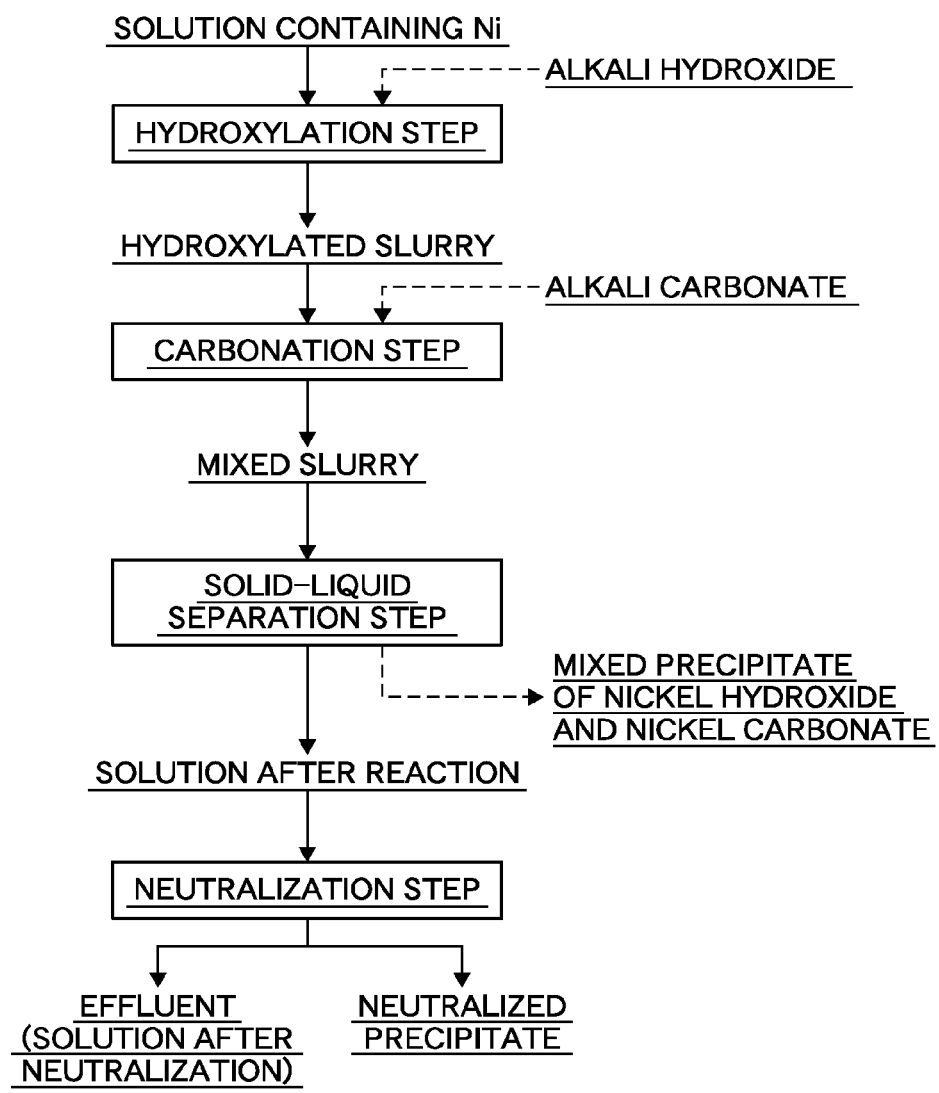
FIG. 2 is a flowchart for the method for removing an impurity element from a solution containing nickel according to the invention.

Hereinafter, the invention is described based on the method for removing an impurity element from a solution containing nickel as shown in FIG. 2, in conformity with the production flow for a high-purity nickel sulfate solution shown in FIG. 1.

[Leaching Step]

This step is a step of forming a leached solution (a nickel-containing solution) after leaching of nickel by dissolving, with mineral acid (hydrochloric acid, sulfuric acid, or the like), a nickel-containing material that serves as a starting material, such as an industrial intermediate, comprising any one selected from nickel-cobalt mixed sulfide, crude nickel sulfate, nickel oxide, nickel hydroxide, nickel carbonate, nickel powder, and the like, or a mixture thereof. This leaching step can be implemented using a well-known method, for example, a method disclosed in Japanese Patent Application Laid-Open No. 2005-350766.

[Solvent Extraction Step]

The solvent extraction step denoted as "solvent extraction step" in FIG. 1 involves bringing an aqueous phase and an organic phase into contact to exchange components of each of the phases, and thereby increasing the concentration of a certain component present in the aqueous phase, while decreasing the concentration of the other component therein. In the present invention, the solvent extraction step is carried out according to a solvent extraction method wherein a solution containing nickel obtained through a leaching step and pH adjustment is used as the aqueous phase, and an organic solvent such as phosphonic acid or phosphinic acid, or an organic solvent containing nickel as disclosed in Patent Document 1 to Patent Document 3, is used as the organic phase.

The flow of the solvent extraction step is carried out such that cobalt, a portion of nickel, and impurities are first extracted into an extractant (organic phase) ("ORGANIC EXTRACTANT 1" in FIG. 1), subsequently the organic extractant 1 is stripped using sulfuric acid to produce a "high-impurity concentration of Ni sulfate solution" containing nickel and impurities at high concentrations ("Ni RECOVERY" in FIG. 1).

Then, a recovered-cobalt-containing solution is produced by stripping the cobalt remaining in the extractant (organic extractant 2) using an acid ("Co RECOVERY" in FIG. 1).

In regard to the solvent extraction, varying the conditions for solvent extraction enables adjustment of the concentration of impurity elements contained in the nickel sulfate solution produced.

Thus, as shown in the "PRODUCTION OF HIGH-IMPURITY CONCENTRATION OF NICKEL SULFATE" of the "dashed arrow 2" in FIG. 1, a high-impurity concentration of nickel sulfate solution, in which impurity elements (including Mg) are concentrated from the organic extractant 1 having Co extracted in the "solvent extraction step", is produced by stripping, and the nickel sulfate solution is subjected to the "method for removing an impurity element". Thereby, Mg among the impurity elements included in the original solution can be discharged out of the system.

Furthermore, a high-purity nickel sulfate solution having a reduced amount of impurity elements, particularly Mg, can be produced by subjecting a pH-adjusted crude nickel sulfate solution that is obtained when a nickel precipitate produced from the high-impurity concentration of nickel sulfate solution by the method for removing an impurity element of the invention is used for the pH adjustment of the leachate, to the solvent extraction step.

[Method for Removing Impurity Element from In-Process Solution]

The method for removing an impurity element from a solution containing nickel in the process is described with reference to FIG. 2.

First, the "solution containing nickel" according to the invention represents an acidic nickel solution.

Particularly, the method can be effectively used for a solution, particularly a solution containing nickel, in the production process of a nickel sulfate production method which includes a leaching step of dissolving a nickel-containing material using an acid; and a solvent extraction step of separating nickel and cobalt in an acidic nickel solution produced by this leaching step, using a solvent extraction method.

The nickel-containing material that serve as a starting raw material refer to any one selected from mixed sulfides of nickel and cobalt, crude nickel sulfate as an industrial intermediate, nickel oxide, nickel hydroxide, nickel carbonate, nickel powder and a mixture thereof, and these materials contain large amounts of impurities, it is thus desirable to treat the nickel-containing material by a solution purification process using a solvent extraction method.

These nickel-containing materials form a leachate containing leached nickel by means of mineral acids such as hydrochloric acid and sulfuric acid; however, at this time, the impurity elements are also eluted into the liquid similarly. Thus, when the concentrations of iron, chromium and aluminum in the leachate are high, a solution purification treatment based on pH adjustment is carried out. Removal of these elements before solvent extraction leads to improvement of the efficiency of the solvent extraction step because of accumulation of iron, chromium and aluminum in the organic solvent.

The present invention can be applied to any in-process solution as long as the solution is an acidic solution containing nickel, in particular, it is effective to apply the invention to a high-impurity concentration solution or a portion of such a solution that has an accumulated or concentrated magnesium at a high concentration therein and is produced particularly by controlling the conditions for the solvent extraction step.

Furthermore, in a conventional production process for nickel sulfate, nickel is included at a high concentration and the impurity concentration is low; however, it is economically efficient to apply the present invention to a solution having a high magnesium concentration and a low nickel concentration as far as possible, since the amount of use of reagents for precipitating nickel can be reduced. In this regard, the solvent extraction step enables adjustment of the element concentration in an aqueous solution simply by optimizing the mixing ratio of the organic phase and the aqueous phase, and accordingly the relevant solution can be easily obtained.

(1) Hydroxylation Step

In the hydroxylation step, an alkali hydroxide is added to an in-process solution, particularly a solution containing nickel, and nickel is precipitated as nickel hydroxide. At this time, cobalt, zinc, copper and the like are precipitated together with nickel and are not thus separated.

However, since magnesium is precipitated at a higher pH than nickel, magnesium may be caused to remain in the solution (solution after hydroxylation), and thus magnesium is separated from nickel.

The alkali hydroxide used at this time is not particularly limited; however, sodium hydroxide, calcium hydroxide, potassium hydroxide and the like have been industrially widely used, and are desirable from the viewpoint of being easily available in large amounts.

The temperature used in the hydroxylation step is not particularly limited; however, the temperature is preferably 40° C. to 80° C.

At a temperature lower than 40° C., the reaction time is excessively prolonged, and larger facilities are needed. At a temperature higher than or equal to 80° C., since resin-based materials cannot be used, there are limitations on the materials of facilities, and the equipment cost is increased.

Furthermore, the pH in this step is preferably in the range of 7.5 to 7.8. When the pH is lower than 7.5, the amount of nickel remaining in the solution after hydroxylation is too large, and the loss of nickel is large. Also, when the pH is higher than or equal to 7.8, magnesium begins to precipitate.

As such, in order to strictly separate nickel and magnesium, it is important to adjust the pH to an appropriate value. However, when an alkali hydroxide is used, the pH of higher than 7.8 causes precipitation of magnesium rapidly. Therefore, advanced technology is needed to adjust and maintain the pH to a pH at which co-precipitation of magnesium is suppressed as much as possible. In addition, in the case that calcium hydroxide is used as the alkali hydroxide, since calcium hydroxide generally includes magnesium as an impurity, a portion of this magnesium is incorporated into the precipitate of nickel hydroxide produced in the hydroxylation step, and therefore, when the precipitate produced is recycled, the precipitate serves as a fresh source of incorporation of magnesium.

Thus, in the hydroxylation step, the system is maintained at pH 7.8 or lower, at which precipitation of magnesium is suppressed and pH adjustment can be achieved easily. On the other hand, nickel that remains in a minute amount in the solution (in the solution after hydroxylation) is recovered in the subsequent step, or the carbonation step.

Performing a hydroxylation step and a carbonation step in combination enables to perform efficiently separation of nickel and magnesium and to keep the amount of the hydroxide reagent used at the minimum, and accordingly a hydroxide alkali containing a large amount of impurities such as calcium hydroxide can also be used without limitations advantageously.

(2) Carbonation Step

Then, in the carbonation step, an alkali carbonate is added to the solution after hydroxylation, and a minute amount of nickel that is contained in the solution after hydroxylation is precipitated as nickel carbonate. At this time, similarly to the hydroxylation step, cobalt, zinc, copper and the like are precipitated together with nickel, and are therefore not separated.

However, since magnesium is precipitated at a higher pH than nickel is, magnesium can be caused to remain in the solution, and is separated from nickel.

The alkali used at this time is not particularly limited; however, sodium carbonate, calcium carbonate, sodium hydrogen carbonate and the like have been industrially widely used and are desirable from the viewpoint of being easily available in large amounts. Among them, the sodium carbonate is suitable as an alkali that has a high salt concentration in the solution to which the present invention is applied, and that can easily increase the pH of the solution to an intended pH value. In a case of the use of sodium carbonate, when a precipitate produced is recycled within the system, sodium is also recycled and contaminates manufactured products. Therefore, the amount of use is limited according to the sodium grade in the manufactured products.

The temperature of the carbonation step is not particularly limited, but preferably 40° C. to 80° C.

At a temperature lower than 40° C., the reaction time is excessively prolonged, larger facilities are needed, and the investment amount is increased. Furthermore, at a temperature higher than or equal to 80° C., since resin-based materials cannot be used, there are limitations on the materials of facilities, and the labor and time for maintenance and the equipment cost are increased.

PH during the process is preferably 7.7 to 8.0. When the pH is lower than 7.7, the amount of nickel remaining in the solution after hydroxylation is too large, and the loss of nickel is large. Also, when the pH is higher than or equal to 8.0, magnesium is also precipitated.

In the carbonation step, since a so-called pH interference action of magnesium carbonate and magnesium hydrogen carbonate occurs in the solution due to the addition of a carbonate salt, it becomes very easy to adjust the pH to an intended value. Furthermore, since the production of a precipitate of magnesium becomes moderate compared with the hydroxylation step due to this interference action, it is suitable for selectively precipitating a minute amount of residual nickel.

(3) Solid-Liquid Separation Step

This is a step of separating and recovering a mixed slurry including a mixed precipitate of nickel hydroxide and nickel carbonate produced in the hydroxylation and carbonation steps, and a solution after reaction as a residual liquid, using a solid-liquid separating apparatus.

The solid-liquid separating apparatus used is not particularly limited, and includes a pressurized filtration apparatus, a suction filtration apparatus, and a centrifugal separation apparatus. The precipitate containing the recovered nickel as a main component can be reutilized by recycling as a portion of a neutralizing agent in the neutralization step for the purpose of removing iron, chromium and aluminum in the leachate.

(4) Neutralization Step

On the other hand, the solution after reaction containing the impurities after the solid-liquid separation is used to form a neutralized solution, that includes a precipitate produced by a neutralization treatment involving the addition of a neutralizing agent and a solution after neutralization, and then the neutralized solution is subjected to solid-liquid separation using a solid-liquid separating apparatus to separate into a neutralized precipitate containing impurity elements and a solution after neutralization.

Here, the neutralizing agent used is not particularly limited; however, sodium hydroxide, calcium hydroxide, magnesium hydroxide and the like are inexpensive and suitable for industrial use.

The pH value to be adjusted upon neutralization is desirably set to the range of 8.0 to 8.5.

It is because when the pH is lower than 8.0, the removal of heavy metals is achieved insufficiently, and when the pH is higher than 8.5, there is a possibility that the pH may exceed the effluent standard value of pH so that it may be necessary to readjust the pH when the effluent is finally discharged.

As discussed above, incorporating the method for removing impurity elements from a solution containing nickel into the production process make it possible to discharge magnesium selectively out of the production process system. Accordingly, accumulation of these elements in the system can be avoided, and high-purity nickel sulfate can be thus produced.

Meanwhile, regarding the form of manufactured products, the nickel sulfate produced by the invention can be produced into a nickel sulfate solution, or into nickel sulfate crystals using a general crystallization method such as crystallization or spray drying.

EXAMPLES

Hereinafter, the invention is described in detail by way of Examples.

Example 1

<Removal of Impurity Elements>

The removal of impurity elements in a solution containing nickel was carried out according to the flowchart of FIG. 2.

(1) Hydroxylation Step and (2) Carbonation Step

As a solution containing nickel (original solution), an acidic sulfuric acid solution indicated in Table 1 was prepared.

Two 500-ml containers were connected such that the original solution was continuously supplied to the first container at a flow rate of 8 ml/min, and the liquid overflowing the first container would be supplied to the second container, and the liquid was discharged from the second container by overflow.

While the solution temperature was maintained to be 40° C. using a water bath, with the solution being stirred with a stirrer, calcium hydroxide (200 g/L) was added dropwise to the first container, and sodium carbonate (200 g/L) was added dropwise to the second container, so as to achieve the intended pH values, and reactions were allowed to occur. Thus, a mixed slurry was produced in the second container.

The pH of the solution in the first container was maintained to be 7.6, and the pH of the solution in the second container was maintained to be 7.9.

(3) Solid-Liquid Separation Step

Next, for the purpose of checking the state of removal of the impurity element concentration, the mixed slurry thus formed was subjected to solid-liquid separation by filtration, and then the solution after reaction thus obtained was subjected to a quantitative analysis of the various elements included in the solution by ICP emission spectroscopy.

The results are presented together in Table 1.

TABLE 1

|  | pH | Ni [g/L] | Co [g/L] | Mg [g/L] |
| --- | --- | --- | --- | --- |
| Original solution | — | 48 | 6.3 | 0.27 |
| Solution after reaction | 7.9 | 1.6 | 0.13 | 0.24 |

From Table 1, it can be seen that almost the approximately-entire amount of nickel has been precipitated, while the change in the concentration of magnesium between the original solution and the solution after reaction is small, and magnesium has remained in the solution after reaction.

Comparative Example 1

As a solution containing nickel (original solution), the acidic sulfuric acid solution indicated in Table 2 was prepared.

Two containers, same as ones used in Example 1, were connected in the same manner as in Example 1, and the original solution was continuously supplied to the first container at a flow rate of 8 ml/min and was discharged from the second container by overflow.

While the solution temperature was maintained to be 40° C. using a water bath, with the solution being stirred with a stirrer, calcium hydroxide (200 g/L) was added dropwise to the first container, and sodium carbonate (200 g/L) was added dropwise to the second container, so as to achieve the intended pH values, and reactions were allowed to occur. Thus, a mixed slurry was produced in the second container.

The pH of the liquid in the first container was maintained to be 7.9, and the pH of the solution in the second container was maintained to be 8.1.

The mixed slurry thus produced was subjected to solid-liquid separation by filtration, and then the solution after reaction thus obtained was subjected to a quantitative analysis of the various elements included in the solution by ICP emission spectroscopy.

The results are presented together in Table 2. It was found that since the pH of the solution was high during the process, the Mg concentration in the solution after reaction was lowered compared to Table 1, and the selective separation performance was poor.

TABLE 2

|  | pH | Ni [g/L] | Co [g/L] | Mg [g/L] |
| --- | --- | --- | --- | --- |
| Original solution | — | 38 | 6.9 | 0.24 |
| Solution after reaction | 8.1 | 0.3 | 0.004 | 0.11 |

Example 2

<Method for Producing High-Purity Nickel Sulfate Solution>

[Leaching Step]

A nickel intermediate serving as a raw material was charged into an autoclave, oxygen was supplied thereto, and high temperature and high pressure leaching was carried out under the conditions described below. Thus, a leachate (acidic sulfuric acid solution containing nickel) was produced.

(Leaching Conditions)

Leaching temperature: 165° C.

Leaching time: 240 minutes

Slurry concentration: 200 g/L

[Solvent Extraction Step]

Subsequently, the pH of the leachate was adjusted, and then as illustrated in FIG. 1, "Co EXTRACTION" is carried out in the "SOLVENT EXTRACTION STEP". The organic extractant 1 obtained at that time was supplied to stripping by an acid under the conditions in which the resulting extract acquired a high impurity concentration, and "Ni RECOVERY" was carried out. Thus, a high-impurity concentration of nickel sulfate solution containing impurities at a high concentration (route indicated by "dashed ARROW 2" in FIG. 1) was obtained. The compositions of these are presented in Table 3.

<Removal of Impurity Elements>

The "method for removing an impurity element" of the invention was applied to the high-impurity concentration of nickel sulfate solution thus obtained.

[Hydroxylation and Carbonation Steps]

As indicated by the "bold and solid arrows" in FIG. 1, while the solution temperature of the high-impurity concentration of nickel sulfate solution thus obtained was maintained at 40° C., calcium hydroxide was added thereto, and the pH was adjusted to 7.6. Subsequently, sodium carbonate was added thereto, and a mixed slurry having the pH adjusted to 7.9 was formed.

Then, the mixed slurry was subjected to solid-liquid separation, and then a solution after reaction was obtained. The composition of the solution after reaction is presented in Table 3.

Regarding the nickel precipitate thus recovered (mixed precipitate of nickel hydroxide and nickel carbonate), the entire amount of the nickel precipitate was repeatedly used as a portion of the neutralizing agent used to adjust the pH of the leachate, and thereby pH adjustment was carried out (dashed arrow 3). Thus, a pH-adjusted crude nickel sulfate solution was obtained. The solution was supplied to the solvent extraction step ("SOLVENT EXTRACTION STEP" in FIG. 1, and a high-purity nickel sulfate solution indicated by the solid arrow 1 was obtained.

The composition of the high-purity nickel sulfate solution produced from the solvent extraction step, which was obtained by the above-described processes, is presented in Table 3.

TABLE 3

| | Ni [g/L] | Co [g/L] | Mg [g/L] | Na [g/L] |
|---|---|---|---|---|
| Leachate | 120 | 9.7 | 0.010 | 0.007 |
| Leachate [after pH adjustment] | 99 | 8.9 | 0.054 | 0.019 |
| High-impurity concentration of nickel sulfate solution | 37 | 6.8 | 0.21 | 0.004 |
| Solution after reaction | 0.43 | 0.078 | 0.16 | 0.81 |
| High-purity nickel sulfate solution | 119 | 0.008 | 0.006 | 0.019 |

Comparative Example 2

A high-impurity concentration of nickel sulfate solution produced through the solvent extraction step of Example 2 and containing impurities at a high concentration, was not subjected to hydroxylation and carbonation treatments, but the entire amount thereof was recycled (dashed-dotted arrow 4) in the process (pH adjustment) and was subjected to the treatment indicated by the "solid ARROW 1" in the flowchart of FIG. 1. The compositions of the various liquids obtained at that time are presented in Table 4.

From the table, it can be seen that the concentration of Mg, which is an impurity element, is increasing compared with the high-purity nickel sulfate solution obtained in Example 2.

TABLE 4

| | Ni [g/L] | Co [g/L] | Mg [g/L] |
|---|---|---|---|
| Leachate | 119 | 9.7 | 0.012 |
| Leachate [after pH adjustment] | 99 | 8.9 | 0.078 |
| High-impurity concentration of nickel sulfate solution | 37 | 6.8 | 0.29 |
| Nickel sulfate solution | 119 | 0.008 | 0.009 |

Comparative Example 3

In the solvent extraction step according to the production process of Example 2, a high-impurity concentration of nickel sulfate solution produced through the solvent extraction step and containing impurities at a high concentration, was treated such that nickel in the solution was precipitated as nickel carbonate using sodium carbonate only.

This slurry was subjected to solid-liquid separation, and then a solution after reaction (solution after carbonation in Table 5) was obtained. The composition of the solution after reaction is presented in Table 5.

Next, regarding the nickel carbonate precipitate recovered after the solid-liquid separation, the entire amount of the nickel precipitate was repeatedly used as a portion of the neutralizing agent used to adjust the pH of the leachate, and pH adjustment was then carried out. Subsequently, the solvent extraction step ("SOLVENT EXTRACTION STEP" in FIG. 1) was carried out, the resultant was subjected to stripping with an acid, and thus a high-purity nickel sulfate solution was produced.

The composition of the high-purity nickel sulfate solution produced by the solvent extraction step, which was obtained by the above-described processes, is presented in Table 5.

TABLE 5

| | Ni [g/L] | Co [g/L] | Mg [g/L] | Na [g/L] |
|---|---|---|---|---|
| Leachate | 119 | 9.7 | 0.010 | 0.033 |
| Leachate [after pH adjustment] | 99 | 8.9 | 0.054 | 0.487 |
| High-impurity concentration of nickel sulfate solution | 37 | 6.8 | 0.204 | 0.086 |
| Solution after carbonation | 0.29 | 0.053 | 0.088 | 25 |
| High-purity nickel sulfate solution | 119 | 0.008 | 0.006 | 0.387 |

Compared with Example 2, it can be seen that when the high-impurity concentration of nickel sulfate solution is treated with the carbonation step only and utilized, the sodium grade in the high-purity nickel sulfate thus obtained is significantly increased.

The invention claimed is:

1. A method for producing a mixed precipitate of nickel hydroxide and nickel carbonate useful in the production of high-purity nickel sulfate; the method comprising:
   providing an acidic sulfuric acid solution containing nickel, the acidic sulfuric acid solution containing nickel being subjected to the following steps in order:
   a hydroxylation step of adding an alkali hydroxide to a portion of the acidic sulfuric acid solution containing nickel, providing a pH range of 7.5 to 7.8 and, forming a hydroxylated slurry that includes a precipitate of nickel hydroxide and a solution after hydroxylation, the solution after hydroxylation containing a portion of nickel which did not form the precipitate of nickel hydroxide;
   a carbonation step of adding an alkali carbonate to the hydroxylated slurry, providing a pH range of 7.7 to 8.0, and carbonating the portion of nickel in the solution after hydroxylation, and forming a mixed slurry that includes the precipitate of nickel carbonate, the precipitate of nickel hydroxide, and a solution after carbonation; wherein the mixed slurry includes a mixed precipitate of nickel hydroxide and nickel carbonate, and the solution after carbonation;
   a solid-liquid separation step of separating the mixed slurry into the mixed precipitate of nickel hydroxide and nickel carbonate, and the solution after carbonation; and
   a neutralization step of subjecting the solution after carbonation to a neutralization treatment at a pH range of 8.0 to 8.5 to produce a neutralized solution including a neutralized precipitate containing an impurity element and a solution after neutralization, and subjecting the neutralized solution to solid-liquid separation to recover the impurity element included in the solution after reaction as the neutralized precipitate containing the impurity element.

2. The method for producing high-purity nickel sulfate of claim 1, wherein the impurity element is magnesium.

3. The method for producing high-purity nickel sulfate of claim 1, further comprising a leaching step of dissolving a nickel-containing material; and a solvent extraction step of separating nickel and cobalt by a solvent extraction method.

4. The method for producing high-purity nickel sulfate of claim 3, wherein the nickel material corresponds to mixed sulfides of nickel and cobalt, crude nickel sulfate as an industrial intermediate, nickel oxide, nickel hydroxide, nickel carbonate, and nickel powder.

5. A method for removing an impurity element from an acid solution containing nickel, the method comprising the following steps:

providing an acid solution that includes nickel and an impurity element: a hydroxylation step of adding an alkali hydroxide to a portion of the acid solution containing nickel, providing a pH range of 7.5 to 7.8, precipitating nickel hydroxide, and forming a hydroxylated slurry that includes the precipitated nickel hydroxide and a solution after hydroxylation, the solution after hydroxylation containing remaining nickel that does not form the nickel hydroxide;

a carbonation step of adding an alkali carbonate to the hydroxylated slurry, providing a pH range of 7.7 to 8.0, precipitating the remaining nickel as nickel carbonate, and forming a carbonated slurry that includes nickel carbonate, and a solution after carbonation, and then forming a mixed slurry including a mixed precipitate of nickel hydroxide and then nickel carbonate, and a solution after reaction;

a solid-liquid separation step of separating the mixed precipitate of nickel hydroxide and nickel carbonate and the solution after reaction; and a neutralization step of subjecting the solution after reaction to a neutralization treatment at a pH range of 8.0 to 8.5 to produce a neutralized solution including a neutralized precipitate containing an impurity element and a solution after neutralization, and subjecting the neutralized solution to solid-liquid separation to recover the impurity element included in the solution after reaction as the neutralized precipitate containing the impurity element.

6. The method of claim 5, wherein the impurity element is magnesium.

* * * * *